United States Patent
Gaur et al.

(10) Patent No.: US 11,229,211 B2
(45) Date of Patent: Jan. 25, 2022

(54) COMPOSITIONS AND METHODS FOR CONTROLLING A HONEY BEE PARASITIC MITE INFESTATION

(71) Applicant: John I. Haas, Inc., Washington, DC (US)

(72) Inventors: Shashank Gaur, Yakima, WA (US); Fabiana Ahumada, Fort Lauderdale, FL (US); Alex Byelashov, Yakima, WA (US)

(73) Assignee: John I. Haas, Inc., Washington, DC (US)

(*) Notice: Subject to any disclaimer, the term of this patent is extended or adjusted under 35 U.S.C. 154(b) by 0 days.

(21) Appl. No.: 16/412,023

(22) Filed: May 14, 2019

(65) Prior Publication Data
US 2019/0343126 A1    Nov. 14, 2019

Related U.S. Application Data

(60) Provisional application No. 62/671,064, filed on May 14, 2018.

(51) Int. Cl.
*A01N 65/08* (2009.01)
*A01N 25/12* (2006.01)
(Continued)

(52) U.S. Cl.
CPC ............ *A01N 65/08* (2013.01); *A01N 25/12* (2013.01); *A01N 25/22* (2013.01); *A01N 25/34* (2013.01); *A01N 43/08* (2013.01); *A01N 59/00* (2013.01)

(58) Field of Classification Search
None
See application file for complete search history.

(56) References Cited

U.S. PATENT DOCUMENTS 3,615,660 A    10/1971    Bavisotto et al.
3,781,425 A    12/1973    Martin et al.
(Continued)

FOREIGN PATENT DOCUMENTS

EP    0 152 190 A1    1/1985
EP    0 212 623 A2    3/1987
(Continued)

OTHER PUBLICATIONS

"Antibiotics: Antibacterial Agents," retrieved from the internet http://users.rcn.com/jkimball.ma.ultranet/BiologyPages/A/Antibiotics.html on Nov. 7, 2016, 10 pages.
(Continued)

*Primary Examiner* — Kyung S Chang
(74) *Attorney, Agent, or Firm* — Seed Intellectual Property Law Group LLP

(57) ABSTRACT

The present invention relates to a formula or composition for use in reducing a honey bee parasitic mite infestation that may comprise, for example, a liquid, solid, or paste composition, comprising about 5-20% beta acids (about 5-75% by weight), about 5-75% by weight propylene glycol, about 5-75% by weight polysorbate 60, about 0.5-35% of a thixotropic material comprising, for example, fumed silica, and/or about 0.5-5% of an antioxidant comprising, for example, ascorbic acid, the composition is active against parasitic mites for more than about 14 days in the bee hives. Compositions of the present invention provide effective control, treatment, or prevention of honey bee parasitic mite infestation by inclusion of, for example, certain excipients that retard beta acid oxidation, prolong availability of active ingredient for bee uptake, improve convenience for beekeepers, or both retard beta acid oxidation and prolong the availability of active ingredient for bee uptake.

27 Claims, 10 Drawing Sheets

(51) Int. Cl.
*A01N 25/34* (2006.01)
*A01N 43/08* (2006.01)
*A01N 59/00* (2006.01)
*A01N 25/22* (2006.01)

(56) References Cited

U.S. PATENT DOCUMENTS

| | | | |
|---|---|---|---|
| 4,002,683 A | 1/1977 | Todd, Jr. | |
| 4,148,873 A | 4/1979 | Owades | |
| 4,170,638 A | 10/1979 | Owades | |
| 4,281,061 A | 7/1981 | Zuk et al. | |
| 4,299,816 A | 11/1981 | Polyakov et al. | |
| 4,562,794 A | 1/1986 | Speckman | |
| 4,682,380 A | 7/1987 | Martin | |
| 4,775,534 A | 10/1988 | Bartlett et al. | |
| 4,837,216 A | 6/1989 | Mehlhorn et al. | |
| 4,844,939 A | 7/1989 | Todd, Jr. | |
| 4,847,292 A | 7/1989 | Katz et al. | |
| 4,867,731 A | 9/1989 | Willard et al. | |
| 4,876,265 A | 10/1989 | Schmid | |
| 4,965,287 A | 10/1990 | Stendel et al. | |
| 5,023,359 A | 6/1991 | Bounias et al. | |
| 5,069,651 A | 12/1991 | Arndt | |
| 5,070,091 A | 12/1991 | Mehlhorn et al. | |
| 5,082,975 A | 1/1992 | Todd, Jr. et al. | |
| 5,135,758 A | 8/1992 | Arnold et al. | |
| 5,158,788 A | 10/1992 | Lavens et al. | |
| 5,166,449 A | 11/1992 | Todd, Jr. et al. | |
| 5,227,162 A | 7/1993 | Ferrari | |
| 5,230,894 A | 7/1993 | Robert et al. | |
| 5,286,506 A | 2/1994 | Millis et al. | |
| 5,312,622 A | 5/1994 | Nagy et al. | |
| 5,348,511 A | 9/1994 | Gross et al. | |
| 5,370,863 A | 12/1994 | Barney et al. | |
| 5,372,817 A | 12/1994 | Locke et al. | |
| 5,455,038 A | 10/1995 | Barney et al. | |
| 5,583,262 A | 12/1996 | Maye et al. | |
| 5,624,701 A | 4/1997 | Maye et al. | |
| 5,750,129 A | 5/1998 | Wakarchuk | |
| 5,827,895 A | 10/1998 | Nutter et al. | |
| 5,849,317 A | 12/1998 | Shorey et al. | |
| 6,010,390 A | 1/2000 | Harper | |
| 6,037,374 A * | 3/2000 | Kochansky | A01N 37/02 424/405 |
| 6,083,254 A | 7/2000 | Evans | |
| 6,096,350 A | 8/2000 | Kemp et al. | |
| 6,204,283 B1 | 3/2001 | Black et al. | |
| 6,221,375 B1 | 4/2001 | Howse | |
| 6,251,461 B1 | 6/2001 | Johnson et al. | |
| 6,277,371 B1 | 8/2001 | Haragsim et al. | |
| 6,419,943 B1 | 7/2002 | Sakurada et al. | |
| 6,450,858 B1 | 9/2002 | Schmitz | |
| 6,451,365 B1 | 9/2002 | King et al. | |
| 6,468,129 B1 | 10/2002 | Griffith | |
| 6,475,061 B1 | 11/2002 | Huang | |
| 6,475,537 B1 | 11/2002 | King et al. | |
| 6,476,015 B1 | 11/2002 | Turos et al. | |
| 6,585,557 B1 | 7/2003 | Remon et al. | |
| 6,595,828 B2 | 7/2003 | Page, Jr. et al. | |
| 6,620,025 B2 | 9/2003 | Scheuneman et al. | |
| 6,620,446 B2 | 9/2003 | King et al. | |
| 6,646,014 B2 | 11/2003 | Watkins | |
| 6,702,645 B2 | 3/2004 | Vanderpool | |
| 6,820,773 B1 | 11/2004 | Orth | |
| 6,837,770 B2 | 1/2005 | Ruzicka | |
| 6,843,985 B2 | 1/2005 | Erickson, Jr. et al. | |
| 7,087,849 B2 | 8/2006 | Brown et al. | |
| 7,137,864 B2 | 11/2006 | Swanson | |
| 7,597,912 B2 | 10/2009 | Probasco | |
| 7,767,234 B2 | 8/2010 | Probasco | |
| 7,879,348 B2 | 2/2011 | Volby | |
| 9,295,252 B2 | 3/2016 | Probasco et al. | |
| 9,545,110 B2 | 1/2017 | Probasco et al. | |
| 2001/0014346 A1 | 8/2001 | Watkins | |
| 2002/0034529 A1 | 3/2002 | Prince et al. | |
| 2002/0051804 A1 | 5/2002 | Probasco et al. | |
| 2002/0094756 A1 | 7/2002 | Labesque | |
| 2002/0151249 A1 | 10/2002 | Scheuneman et al. | |
| 2002/0182977 A1 | 12/2002 | Page, Jr. et al. | |
| 2003/0010817 A1 | 1/2003 | Lingle et al. | |
| 2003/0027490 A1 | 2/2003 | Wilkinson | |
| 2003/0032669 A1 | 2/2003 | Verbruggen et al. | |
| 2003/0044443 A1 | 3/2003 | Erickson, Jr. et al. | |
| 2003/0060379 A1 | 3/2003 | Souter et al. | |
| 2003/0154508 A1 | 8/2003 | Stevens et al. | |
| 2003/0190860 A1 | 10/2003 | Vanderpool | |
| 2003/0215535 A1 | 11/2003 | Wilson et al. | |
| 2003/0228814 A1 | 12/2003 | Barney et al. | |
| 2004/0077291 A1 | 4/2004 | Arthur et al. | |
| 2004/0131709 A1 | 7/2004 | Berdahl et al. | |
| 2004/0175480 A1 | 9/2004 | Seman et al. | |
| 2004/0229542 A1 | 11/2004 | Ruzicka | |
| 2005/0031743 A1 | 2/2005 | Areso | |
| 2005/0043404 A1 | 2/2005 | Probasco et al. | |
| 2005/0048093 A1 | 3/2005 | Milani et al. | |
| 2005/0049230 A1 | 3/2005 | Henrich et al. | |
| 2005/0090560 A1 | 4/2005 | Erickson, Jr. et al. | |
| 2005/0095954 A1 | 5/2005 | Castillo | |
| 2005/0220914 A1 | 10/2005 | Probasco et al. | |
| 2006/0008492 A1 | 1/2006 | Janowicz et al. | |
| 2006/0009122 A1 | 1/2006 | Swanson | |
| 2006/0009211 A1 | 1/2006 | Sato | |
| 2006/0013870 A1 | 1/2006 | Kuhrts | |
| 2006/0141904 A1 | 6/2006 | Teal et al. | |
| 2007/0026765 A1 | 2/2007 | Renn | |
| 2007/0059333 A1 | 3/2007 | Volby | |
| 2007/0232188 A1 | 10/2007 | Probasco | |
| 2007/0248549 A1 | 10/2007 | Kuhrts | |
| 2008/0026673 A1 | 1/2008 | Probasco | |
| 2009/0104288 A1 | 4/2009 | Probasco | |
| 2010/0087121 A1 | 4/2010 | Probasco | |
| 2010/0227010 A1 | 9/2010 | Jones | |
| 2011/0182958 A1 | 7/2011 | Omidbakhsh | |
| 2013/0145679 A1 | 6/2013 | Nenninger | |
| 2013/0337520 A1 * | 12/2013 | Fox | C12P 7/065 435/161 |
| 2014/0127968 A1 * | 5/2014 | Probasco | A01K 51/00 449/2 |
| 2015/0150252 A1 | 6/2015 | Probasco et al. | |

FOREIGN PATENT DOCUMENTS

| | | | |
|---|---|---|---|
| EP | 0 339 147 A1 | 11/1989 | |
| EP | 0 441 750 A1 | 8/1991 | |
| EP | 0 681 029 A2 | 11/1995 | |
| EP | 0 816 430 A2 | 1/1998 | |
| EP | 0 824 093 A1 | 2/1998 | |
| GB | 592090 A | 9/1947 | |
| GB | 1058975 A | 2/1967 | |
| GB | 2 330 076 A | 4/1999 | |
| JP | 50-24244 A | 3/1975 | |
| JP | 57-80304 A | 5/1982 | |
| WO | 94/09759 A2 | 5/1994 | |
| WO | 97/33971 A1 | 9/1997 | |
| WO | 99/09842 A1 | 3/1999 | |
| WO | 01/06877 A1 | 2/2001 | |
| WO | WO-0176367 A1 * | 10/2001 | A01N 37/06 |
| WO | 2007/037905 A2 | 4/2007 | |
| WO | 2008/060591 A2 | 5/2008 | |
| WO | 2009/098300 A2 | 8/2009 | |
| WO | 2009/099646 A1 | 8/2009 | |
| WO | 2010/131058 A1 | 11/2010 | |
| WO | 2012/170420 A2 | 12/2012 | |
| WO | 2013/185059 A2 | 12/2013 | |

OTHER PUBLICATIONS

"Culpeper's Complete Herbal: A book of Natural Remedies for Ancient Ills," Wordsworth Reference, pp. 134-135, 1995 (2 pages).
"HopGuard Section 18 Specific Exemption," BetaTec hop products, 1 page.

(56) References Cited

OTHER PUBLICATIONS

"HopGuard: the new Varroa pesticide," Honey Bee Suite, downloaded Jun. 17, 2016, Online document obtained from http://honeybeesuite.com/hoguard-the-new-varroa-pesticide/, 5 pages.
"The Small Hive Beetle: A New Pest of Honey Bees," Alabama A&M and Auburn Universities, 2001 (4 pages).
"Tracheal Mites," Mid-Atlantic Apicultural Research and Extension Consortium, MAAREC Publication 4.2, 2000 (2 pages).
"Varroa Mites," Mid-Atlantic Apicultural Research and Extension Consortium, MAAREC Publication 4.7, 2005 (2 pages).
BetaTecHopProducts' channel, "HopGuard—Varroa Mite Control," YouTube, Uploaded on Mar. 5, 2011, Online document obtained from http://www.youtube.com/watch?v=T2y4mdPhio.
Botanix, "Hops Products Isohop" retrieved Apr. 16, 2003 from http://www.gne22.dial.pipex.com/isohop.html, 1 page.
Chapter 2.2.6: Tropilaelaps Infestation of Honey Bees (*Tropilaelaps* spp.). OIE Terrestrial Manual 2008, pp. 419-423, http://www.oie.int/fileadmin/Home/eng/Health_standards/tahm/2.02.06_TROPILAELAPS.pdf.
DeGrandi-Hoffman et al., "The effects of beta acids from hops (*Humulus lupulus*) on mortality of Varroa destructor (Acari: Varroidae)," *Exp Appl Acarol* 58:407-421, 2012.
Extended European Search Report for European Application No. 12796924.4, dated May 21, 2015, 12 pages.
Extended European Search Report for European Application No. 13800867.7, dated Oct. 20, 2015, 12 pages.
Extended European Search Report for European Application No. 14735165.4, dated Apr. 29, 2016, 11 pages.
First Examination Report for Australian Application No. 2014203897, dated Dec. 2, 2016, 3 pages.
Haas Products & Applications, http://www.john-i-haas.com/products/getinfo_products.htm?prod=isohop, retrieved Nov. 7, 2016, 2 pages.
International Search Report for International Application No. PCT/US2007/23984, dated Aug. 29, 2008, 3 pages.
International Search Report for International Application No. PCT/US2014/010347, dated May 2, 2014, 3 pages.
International Search Report for International Application No. PCT/US2012/040907, dated Dec. 28, 2012, 3 pages.
International Search Report for International Application No. PCT/US2013/044757, dated Dec. 12, 2013, 3 pages.
Jones et al., "Repellent and Oviposition-Deterring Effects of Hop-Beta Acids on the Two-Spotted Spider Mite *Tetranychus Urticae*," *Pesticide Science* 47:165-169, 1996.
Jones, "Potential Control of Two-Spotted Spider Mite, Tetranychus Urticae Koch, Using Hop β-Fraction," 1998, pp. 1-169, A thesis submitted for the degree of Doctor of Philosophy of the University of London and for the Diploma of Imperial College of Science, Technology & Medicine.
Kaneda et al., "Beer Adsorption on a Lipid Membrane as Related to Sensory Evaluation", *Journal of the American Society of Brewing Chemists* 59(8):2001, http://www.asbcnet.org/publications/journal/vol/abstracts/0912-04a.htm, 1 page (Abstract Only).
Losel et al., "The Potential of Semiochemicals for Control of *Phorodon humuli* (Homoptera: Aphididae)," *Pestic. Sci.* 48:293-303, 1996.
Newsletter of the Bayside Brewers Club Incorporated, May 1996, http://www.home.alone.net.au/bbc/bbcmay.html, 6 pages.
Nordenfors et al., "Effects of Temperature and Humidity on Oviposition, Molting, and Longevity of *Dermanyssus gallinae* (Acari: Demanyssidae)," *Journal of Medical Entomology* 36(1):68-72, 1999.
Sammataro et al., "Parasitic Mites of Honey Bees: Life History, Implications, and Impact," *Annu. Rev. Entomol* 45:519-548, 2000.
Sharma et al., "Efficacy of Some Acaricides Against Extoparasitic Mite *Tropilaelaps clareae* Infesting European Honey Bee *Apis mellifera*," *Indian J. Agric. Res* 37(1):60-63, 2003 (6 pages).
Simpson, "Studies on the Sensitivity of Lactic Acid Bacteria to Hop Bitter Acids," *J. Inst. Brew.* 99:405-411, 1993.
Simpson, "Synergism Between Hop Resins and Phosphoric Acid and its Relevance to the Acid Washing of Yeast," *J. Instr. Brew.* 93:405-406, 1987.
Supplementary Partial European Search Report for European Application No. 12796924.4 dated Jan. 28, 2015, 5 pages.
Sutherland, "Spider Mites," New Mexico State University O & T Guide, O-#08, 2006 (3 pages).

* cited by examiner

Bars are means ± standard deviation, n= 3 *$P<0.05$.

COMPOSITIONS AND METHODS FOR CONTROLLING A HONEY BEE PARASITIC MITE INFESTATION

TECHNICAL FIELD

The present invention relates to a formula or composition for use in reducing a honey bee parasitic mite infestation. Compositions of the present invention provide effective control, treatment, or prevention of honey bee parasitic mite infestations by inclusion of, for example, certain excipients that retard beta acid oxidation, prolong availability of active ingredient for bee uptake, improved convenience for beekeepers, and may both retard beta acid oxidation and prolong the availability of active ingredient for bee uptake.

SUMMARY OF THE INVENTION

As described below, the present invention comprises compositions useful for controlling, treating, or preventing honey bee parasitic mite infections and comprising excipients that allow these compositions to stay wet and/or biologically active for at least about 14 or more days.

Exemplary compositions of the present invention may comprise about 5% to about 75% by weight hop beta acids, about 5% to about 75% by weight solvent, about 5% to about 75% by weight emulsifier, and at least one of 0.5% to about 35% by weight fumed silica and 0.5% to about 5% by weight ascorbic acid or another antioxidant. The present invention includes one or more new formulation excipients, such as a thixotropic material and/or an antioxidant material. The present invention also provides formulations suitable for use as part of, or to form all of, new delivery vehicles comprising, for example, patties, pastes, plastic porous strips, other strip materials, pads, powders, etc. Additionally, the present invention provides formulations wherein the proportion of solvent and emulsifier excipients relative to each other and/or relative to the total composition (by weight) are substantially or significantly changed relative to the conventional art.

Hop acid oxidation is caused by oxygen containing species in hops and atmospheric oxygen via auto oxidation or through secondary oxidation, where the oxygen molecule indirectly oxidizes hop acids by first reacting with hop oil compounds creating pro-oxidants and then oxidizing hop acids. Hop acids oxidize and chemically deteriorate at high temperature and in presence of oxygen (Benitez, J. L.; Foster, A.; De Keukeleire, D.; Moir, M.; Sharpe, F. R.; Verhagen, L. C.; Wetwood, K. T. Hops and hop products. In Manual of Good Practice; European Brewery Convention: 1997). Beta acids (lupulone, colupulone, and adlupulone) in hops have isoprenyl chain that is sensitive to autoxidation resulting in oxidation product hulupones (Verzele 1991, Briggs 2004) (FIG. 1). Such oxidation is detrimental to the effectiveness of hop beta acids for controlling, treating, or preventing honey bee parasitic mite infections. Natural antioxidants such as vitamin C (ascorbic acid), vitamin A, tocopherols, carotenoids, lutein, lycopene, polyphenols like flavonoids or synthetic antioxidants such as propyl gallate, tertiary butylhydroquinone, butylated hydroxyanisole, butylated hydroxytoluene could be used to prevent oxidation of hop beta acids.

The rate of oxidative degradation of beta acids increases with the increase in surface area exposed to air oxygen exposition. Krofta found higher rate of beta acid degradation when spread on surface of solid carriers such as cellulose powder or silica sand compared to leaf hops (Krofta, K., Vrabcová, S., Mikyška, A., Jurková, M., Cajka, T., & Hajslová, J. (2013). *Stability of hop beta acids and their decomposition products during natural ageing* (Vol. 1010) ("Krofta")). For example, HopGuard® Strips with a thin beta acid layer of formulation allow greater exposure to oxygen in the bee hives. Such greater oxygen exposure can be detrimental to the effectiveness and/or duration of the HopGuard Strips. Here, the present invention solves problems associated with oxidation and moisture retention characteristic of conventional miticide formulations and delivery vehicles.

Thixotropic materials such as fumed silica, microparticles of alumina, aluminum nitride, carbon black, nanocarbons, could be used to form layers of formulation on delivery vehicles such as strip, gel, paste, patty or powder, to protect beta acid from oxidative degradation, prolong availability of beta acid for bee uptake, reduce drip loss and bee agitation due to dripping in hives, mask any bee repellant odor, and improve convenience for bee keepers.

Fumed silica (CAS 112945-52-5) is a low density high surface area powder which when mixed with fluids increases the viscosity and exhibits a thixotropic behavior.

Thixotropy is a time-dependent shear thinning property where the thick gel and colloids convert into fluid when agitated. Thixotropy may also be described as the property of becoming less viscous when subjected to an applied stress, shown for example by some gels that become temporarily fluid when shaken or stirred. This property is utilized in the present invention where bees receive a small dose of beta acid on interacting with the delivery system over a longer period of time instead of getting drenched, as seen with the formulations without fumed silica. In addition, fumed silica containing formulations are not chewed by bees since the cardboard strips are not exposed due to the presence of thick layers of the formulation.

EXAMPLES

Example 1

Development of HopGuard® Formulations and Testing Protocol

Five Hop formulations and one control formulation with zero hop beta acid were developed at Haas Innovations Center, John I Haas, Inc., Yakima, Wash. TABLE. 1 is a table showing the composition of various HopGuard® formulations

TABLE 1

| S. no. | Product | Hop Beta Acid Resins (%) | Propylene Glycol (%) | Polysorbate 60 (%) | Fumed Silica (%) | Ascorbic acid (%) |
|---|---|---|---|---|---|---|
| 1 | HopGuard II | 33 | 33 | 33 | 0 | 0 |
| 2 | HopGuard II + 5% Ascorbic acid | 33 | 28 | 33 | 0 | 5 |
| 3 | HopGuard III/ HopGuard III Strip | 33 | 10 | 55.25 | 1.75 | 0 |
| 4 | HopGuard III Paste | 33 | 10 | 52 | 5 | 0 |
| 5 | HopGuard III Patty | 33 | 10 | 42 | 15 | 0 |
| 6 | Control | 0 | 50 | 50 | 0 | 0 |

In one embodiment, natural antioxidant ascorbic acid was used at the rate of 5% in the formulation while reducing the propylene glycol content to develop HopGuard® II+5% ascorbic acid strips. Other natural antioxidants such as, for example, vitamin A, tocopherols, carotenoids, lutein, lycopene, polyphenols like flavonoids or synthetic antioxidants such as propyl gallate, tertiary butylhydroquinone, butylated hydroxyanisole, and butylated hydroxytoluene could be used for the same purpose.

Excipient fumed silica, a thixotropic material, was used to form gel, colloids and paste that convert into fluid when agitated due to bee interaction. The consistency of Hop-Guard® formulations was found to change with the level of excipient fumed silica added to the formulation, which allowed development of different delivery products such as liquid, paste, gel, patty or powder. Other materials with similar properties such as, for example, microparticles of alumina, aluminum nitride, carbon black, and nanocarbons, etc. could be used to achieve the desired outcome.

Figure 1:
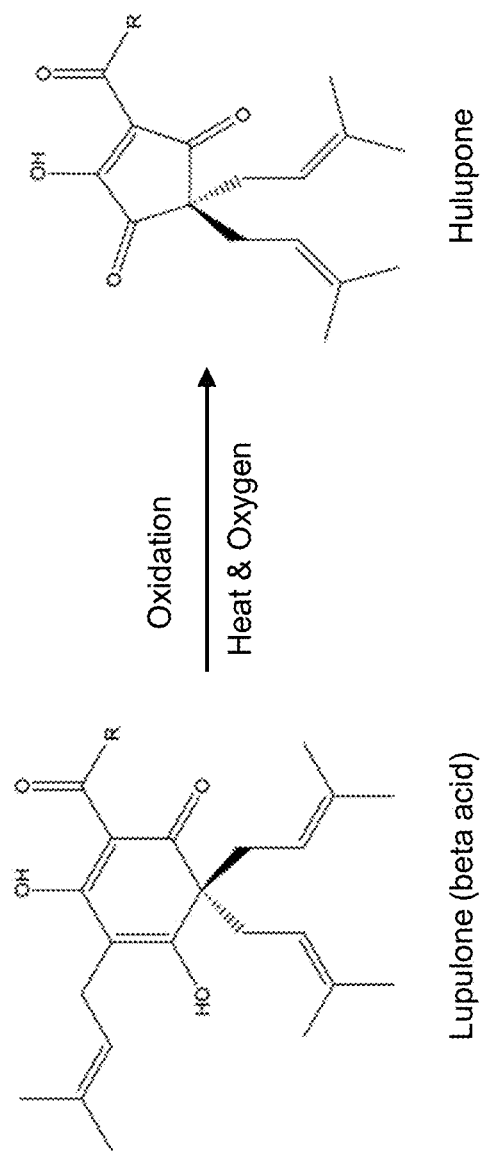
FIG. 1 is a picture showing the oxidative conversion of hop beta acid, lupulone, to degradation product hulupone in the presence of heat and oxygen.
Figure 2:
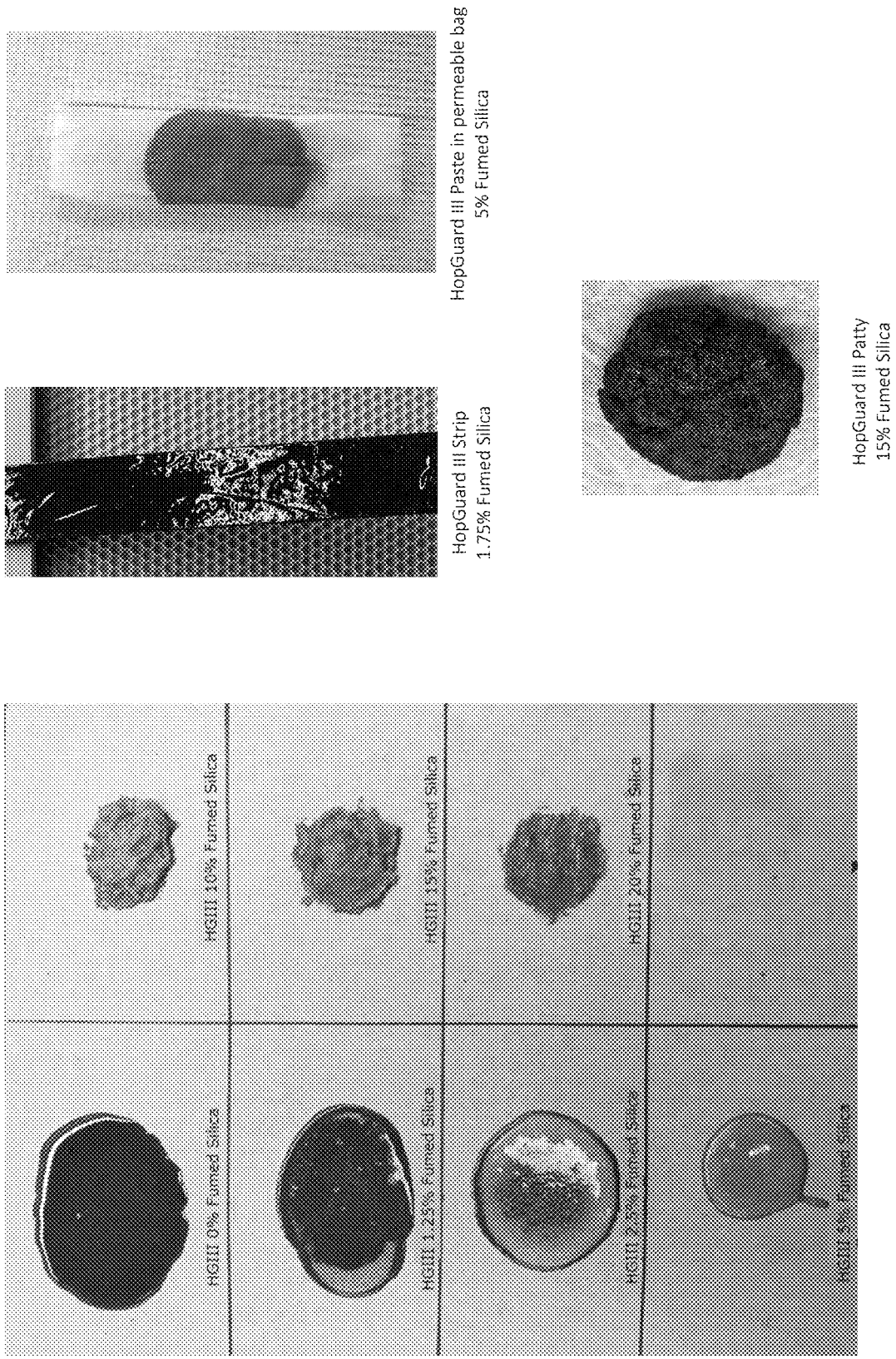
FIG. 2 provides pictures showing different formulations of HopGuard® III and various delivery methods.

Three formulations, HopGuard® II, HopGuard® II+5% Ascorbic acid and HopGuard® III were prepared by soaking corrugated cardboard strips, with mylar backing, 17.5 (L)× 1.25 (B) folded in half, with liquid formulation added at the rate of 25 g per strip. Strips were placed in an aluminum foil bag (13×5 inches) and soaked in formulation for 24 hours. HopGuard® III paste formulation was added to a permeable bag at the rate of 25 g per bag (FIG. 2). HopGuard® III patty formulation was developed into a 25 g patty and placed on an impervious cardboard sheet.

In a preferred embodiment, cardboard strip products are intended to be hung between the frames of beehives, whereas, paste and patty formula are intended to be placed on top of the frames or any other area where bees could interact with the product, for example the entrance.

For testing of formulations in the lab, a Thermolyne (oven series 9000) hot air incubator was used to simulate beehive environment with a controlled temperature of 35° C. and relative humidity of 35%. The strips were hung in the incubator, whereas the paste and patty based formulas were placed on a wire rack. Samples were pulled out in triplicate on a given time point, weighed, placed in Ziploc bags, flushed with nitrogen gas, and stored under nitrogen flush at 5° C. until analysis for beta acid using HPLC as µg/inch$^2$ for strips and µg/g for paste and patty products.

For testing of formulations in the beehives, the products were tested in full strength bee colonies at Carl Hayden Bee Research Facility in Tucson, Ariz. For strip based formulas, two strips (25 g liquid formulation per strip) per hive were hung over the center brood frame near the middle of the frame with one half of the strip on each side of the frame. The paste and patty based products were placed on top of the center brood frames at the rate of two permeable bags (25 g each) or two patties (25 g each) per hive. Samples were pulled out in triplicate on a given time point, placed in Ziploc bags, flushed with nitrogen gas and stored under nitrogen flush at 5° C., until analysis for beta acid using HPLC.

Example 2

Figure 3:
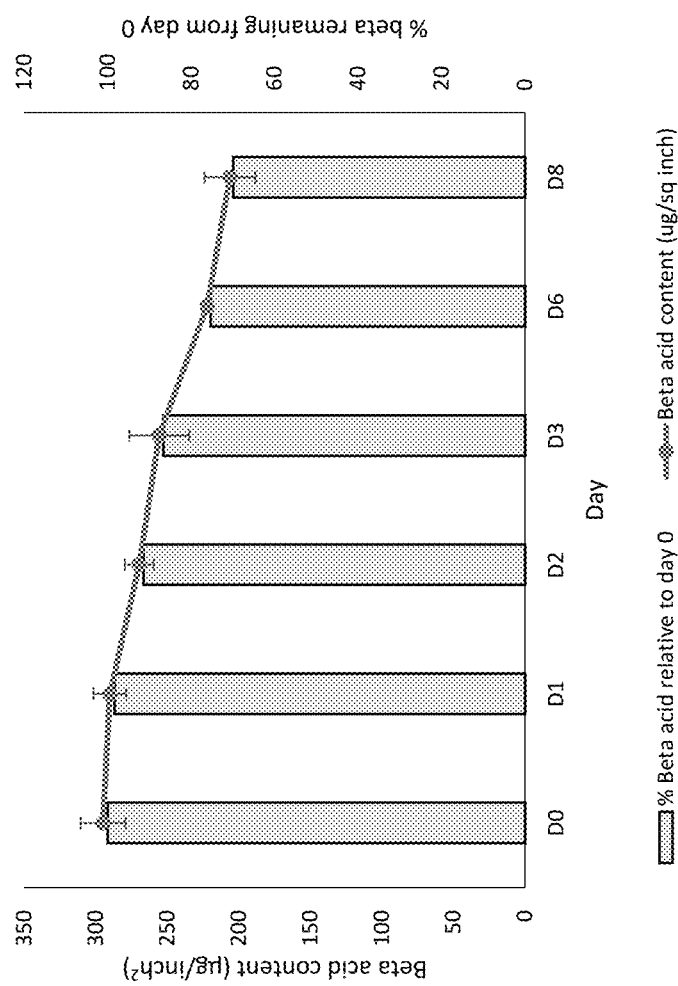
FIG. 3 is a graph showing hop beta acid degradation in HopGuard® II strips under simulated beehive conditions (35° C., 35% RH) over a period of 8 days.
Figure 4:
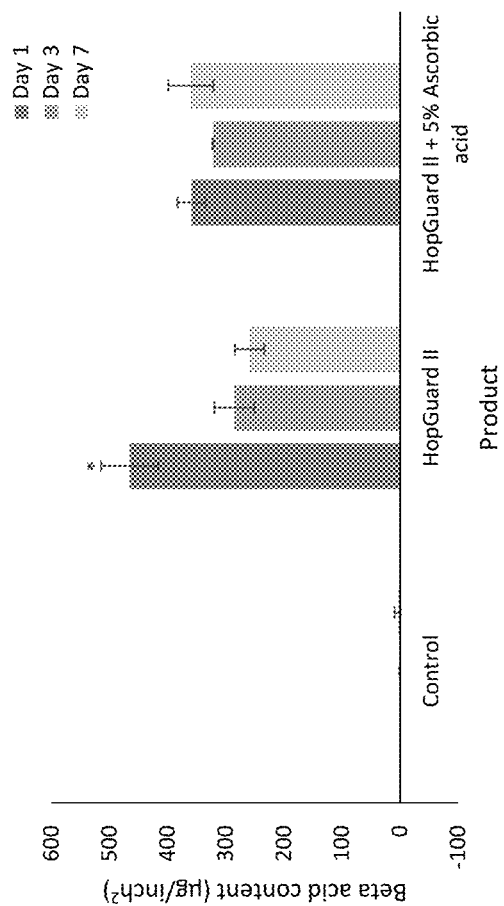
FIG. 4 and FIG. 5. are graphs showing hop beta acid degradation in HopGuard® II and HopGuard® II+5% Ascorbic acid (antioxidant strips) under simulated beehive conditions (35° C., 35% RH) and actual beehives, respectively. For simulated beehive conditions, the strips were collected on day 1, 3 and 7 and for actual beehive, the strips were collected on day 0 and 14.
Figure 5:
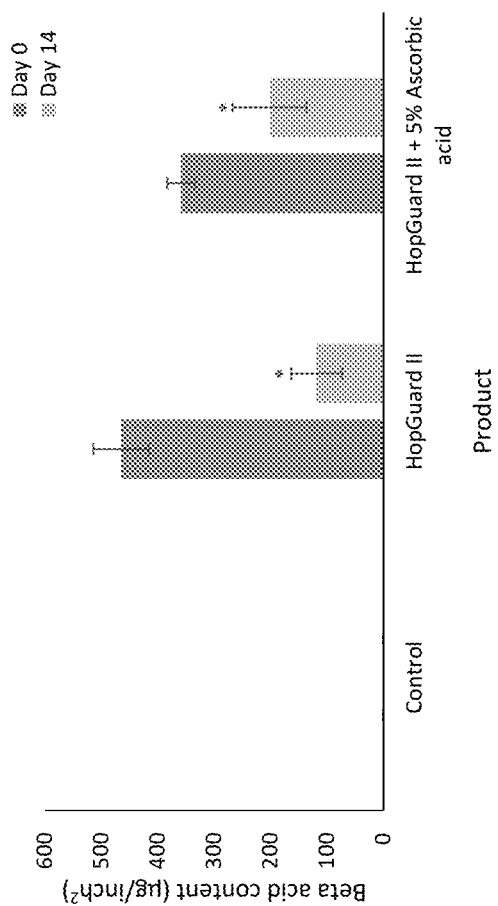

Inclusion of Antioxidant/s in the HopGuard® Formula Decreases Oxidative Degradation of Hop Beta Acid In a preliminary experiment, our currently available product, HopGuard® II, was found to have 30% beta acid degradation over a period of 8 days under simulated hive conditions as described above (FIG. 3). When tested in lab, using protocol described in example 1, the HopGuard® II+5% Ascorbic acid strips were found to have no beta acid degradation ($p<0.05$) over a period of 7 days, where 35% degradation of beta acid was observed in the HopGuard® II product (FIG. 4). When tested in beehives, the HopGuard® II+5% Ascorbic acid strips were found to have relatively lower beta acid degradation (44% degradation) when compared with HopGuard® II product (75% degradation) over a period of 14 days (FIG. 5).

Example 3

Figure 6:
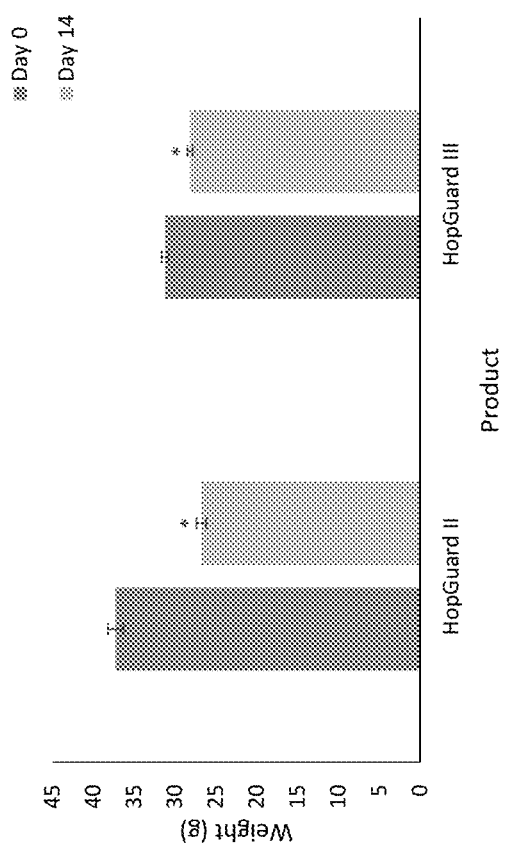
FIG. 6 is a graph showing weight of strip based products, HopGuard® II and HopGuard® III strips under simulated in-hive conditions (35° C., 35% RH) on day 0 and day 14.
Figure 7:
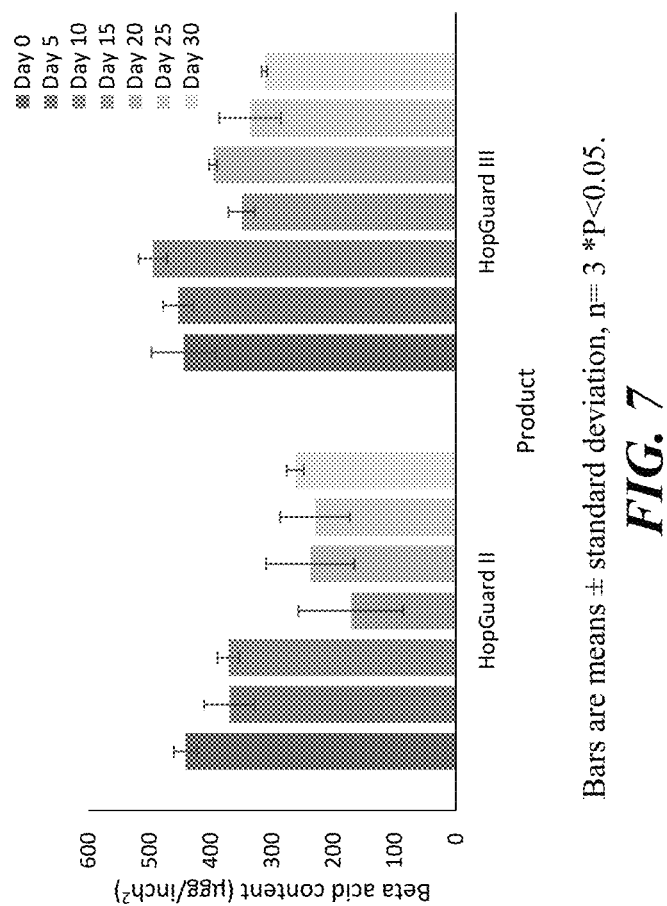
FIG. 7 is a graph showing hop beta acid oxidation of strip based products, HopGuard® II and HopGuard® III under simulated in-hive conditions (35° C., 35% RH) over a period of 30 days.

Addition of Excipient Fumed Silica Prolongs Availability of Product from HopGuard® Strips and Retards Oxidative Degradation of Beta Acids Two strip based products, HopGuard® II and HopGuard® III were tested for change in strip weight and beta acid degradation under simulated hive conditions over a period of 14 days using protocol described in Example 1. Strip weight and wetness were used as an indicator of the availability of product for bee uptake. Fumed silica in HopGuard® III strip prevented the reduction of strip weight via evaporative drying or drip loss, while keeping the strip wet on touch (observation), thereby enabling the strip to last longer (FIG. 6). On the other hand, HopGuard® II strips were completely dry (observation) and had a relatively greater change in weight over a period of 14 days. When tested for beta acid content, HopGuard® II strips had higher degradation of beta acid (41%) compared to HopGuard® III strips (30%) after 30 days (FIG. 7).

Figure 8:
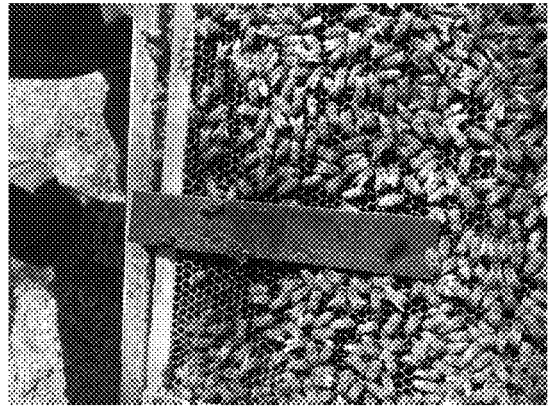
FIG. 8 are pictures showing chewing bee behavior and strip condition for HopGuard® II and HopGuard® III strips on day 14 in beehives.
Figure 8:
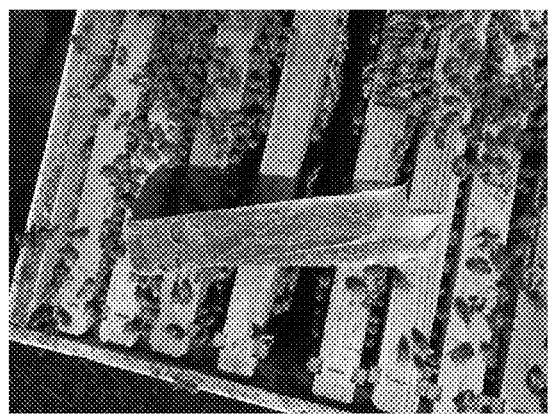

The strips were tested in bee hives to observe bee response to HopGuard® II and HopGuard® III over a period of 14 days. HopGuard® III strips were found wet on touch (observation) and visibly intact on day 14 whereas HopGuard® II strips were completely dry and partially or completely chewed up by the bees with mylar film exposed (FIG. 8). HopGuard® III strips were found to cause no bee agitation (which is related to the product) in the beehives due to negligible product dripping unlike HopGuard® II strips which dripped on the bees and in and around the beehive causing bee agitation. There was no or negligible bee repellency to either of the products tested.

Example 4

Figure 9:
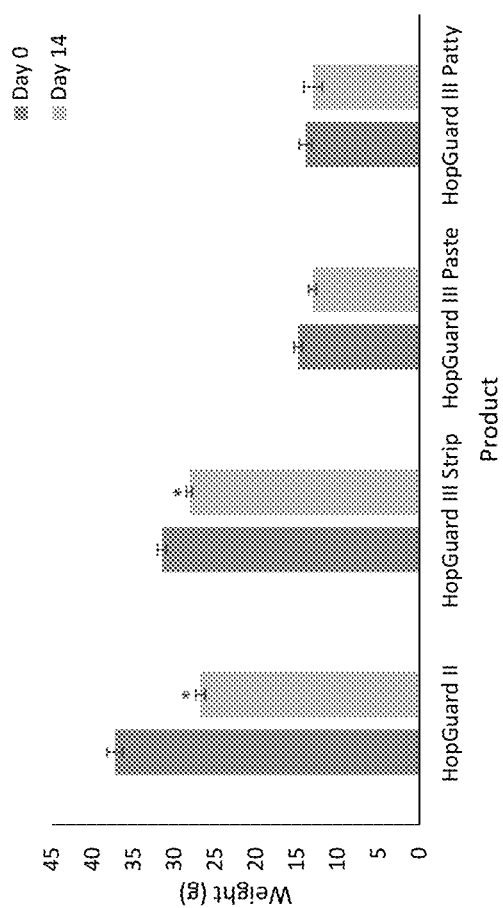
FIG. 9 is a graph showing weights of different delivery products under simulated in-hive conditions (35° C., 35% RH) on day 0 and day 14.
Figure 10:
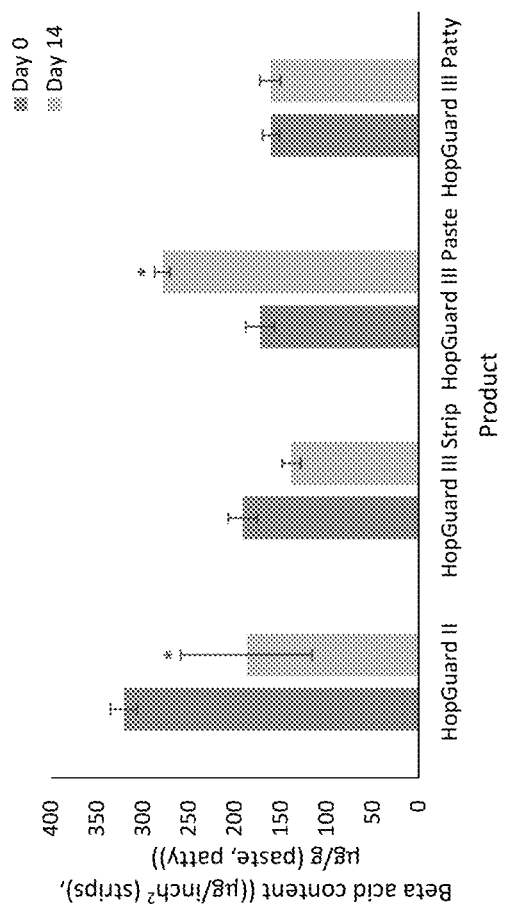
FIG. 10 is a graph showing hop beta acid degradation of different delivery products under simulated in-hive conditions (35° C., 35% RH) on day 0 and day 14.

Excipient Fumed Silica Based HopGuard® III Paste and Patty Delivery Prolongs Availability of Product and Prevents Oxidative Degradation of Beta Acids Two formulations, HopGuard® III paste and patty were tested for change in product weight and beta acid degradation under simulated hive conditions over a period of 14 days as described in Example 1. Strip weight and wetness were used an indicator of the availability of product for bee uptake. Both weight and beta acid content did not change ($P<0.05$) in the products, instead beta acid content of HopGuard® III paste was found to increase by 38% on day 14, probably due to the concentration of beta acid (FIG. 9, 10). Similar to HopGuard® III strips as discussed in example 3, HopGuard® III paste and patty product performed good and perhaps better in the bee hives.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A composition comprising about 5% to about 75% by weight hop beta acids, about 5% to about 29% by weight solvent, about 5% to about 75% by weight emulsifier, and about 0.5% to about 35% by weight fumed silica, wherein the hop beta acid degradation is about 30% over a period of about 30 days, and wherein the composition is moist for a period of at least about 14 days.

2. The composition of claim 1, wherein at least one of the hop beta acids are potassium salts of hop beta acids; the solvent is propylene glycol; and the emulsifier is polysorbate 60.

3. The composition of claim 1, wherein the composition comprises about 30% to about 35% by weight hop beta acids, about 10% to about 29% by weight solvent, about 30% to about 35% by weight emulsifier, about 0.5% to about 25% by weight fumed silica and, optionally, further comprising about 5% by weight ascorbic acid.

4. The composition of claim 1, wherein the composition is in the form of a liquid, a strip, a patty, a paste, a pad, or a powder.

5. The composition of claim 1, wherein the fumed silica maintains composition availability for bee uptake or reduces beta acid degradation or reduces bee agitation by minimum dripping on bees in beehives.

6. The composition of claim 1, wherein the composition further comprises 0.5% to about 5% by weight ascorbic acid or another antioxidant.

7. The composition of claim 6, wherein the ascorbic acid reduces beta acid degradation.

8. The composition of claim 6, comprising both fumed silica and ascorbic acid.

9. The composition of claim 1, wherein the composition is active against parasitic mites.

10. A method of controlling a honey bee parasitic mite infestation in a honey bee population comprising: exposing a honey bee population to the composition of claim 1.

11. The method of claim 10, wherein at least one of the hop beta acids are potassium salts of hop beta acids; the solvent is propylene glycol; and the emulsifier is polysorbate 60.

12. The method of claim 10, further comprising about 20% to about 35% by weight hop beta acids, about 20% to about 29% by weight solvent, about 20% to about 35% by weight emulsifier, and 15% by weight fumed silica and, optionally, further comprising about 5% by weight ascorbic acid.

13. The method of claim 10, further comprising providing the composition in the form of a strip, a patty, a paste, a pad, or a powder.

14. The method of claim 10, further comprising 0.5% to about 5% by weight ascorbic acid.

15. The method of claim 10, further comprising providing ascorbic acid in an amount sufficient to reduce beta acid degradation.

16. The method of claim 12, comprising both fumed silica and ascorbic acid.

17. The composition of claim 1, wherein the composition is in the form of a liquid, a patty, a paste, or a pad.

18. A composition comprising about 5% to about 75% by weight hop beta acids, about 5% to about 75% by weight solvent, about 5% to about 75% by weight emulsifier, and about 0.5% to about 6% by weight fumed silica, wherein the hop beta acid degradation is about 30% over a period of about 30 days, and wherein the composition is moist for a period of at least about 14 days.

19. The composition of claim 18, wherein at least one of the hop beta acids are potassium salts of hop beta acids; the solvent is propylene glycol; and the emulsifier is polysorbate 60.

20. The composition of claim 18, wherein the composition comprises about 30% to about 35% by weight hop beta acids, about 10% to about 29% by weight solvent, about 30% to about 35% by weight emulsifier, about 1% to about 6% by weight fumed silica, and further comprising about 5% by weight ascorbic acid.

21. The composition of claim 18, wherein the composition is in the form of a liquid, a strip, or a paste.

22. The composition of claim 18, wherein the composition comprises about 1% to about 6% by weight fumed silica.

23. The composition of claim 18, wherein the fumed silica maintains composition availability for bee uptake or reduces beta acid degradation or reduces bee agitation by minimum dripping on bees in beehives.

24. The composition of claim 18, wherein the composition further comprises about 3% to about 5% by weight ascorbic acid.

25. The composition of claim 24, wherein the ascorbic acid reduces beta acid degradation.

26. The composition of claim 18, further comprising ascorbic acid.

27. The composition of claim 18, wherein the composition is active against parasitic mites.

\* \* \* \* \*

UNITED STATES PATENT AND TRADEMARK OFFICE
CERTIFICATE OF CORRECTION

Page 1 of 1

PATENT NO. : 11,229,211 B2
APPLICATION NO. : 16/412023
DATED : January 25, 2022
INVENTOR(S) : Shashank Gaur et al.

It is certified that error appears in the above-identified patent and that said Letters Patent is hereby corrected as shown below:

In the Claims

Column 6, Claim 12, Line 21:
"The method of claim 10, further comprising about" should read: --The method of claim 10, comprising about--;

Column 6, Claim 16, Line 35:
"The method of claim 12, comprising" should read: --The method of claim 10, comprising --.

Signed and Sealed this
Twenty-ninth Day of August, 2023

Katherine Kelly Vidal
*Director of the United States Patent and Trademark Office*